(12) United States Patent
Zhang et al.

(10) Patent No.: US 12,379,033 B2
(45) Date of Patent: Aug. 5, 2025

(54) ELECTRIC VALVE (71) Applicant: ZHEJIANG SANHUA COMMERCIAL REFRIGERATION CONTROLS CO., LTD., Zhejiang (CN)

(72) Inventors: Xingkui Zhang, Zhejiang (CN); Yunzhi Lan, Zhejiang (CN); Zhenshan Zhu, Zhejiang (CN)

(73) Assignee: ZHEJIANG SANHUA COMMERCIAL REFRIGERATION CONTROLS CO., LTD., Zhejiang (CN)

( * ) Notice: Subject to any disclaimer, the term of this patent is extended or adjusted under 35 U.S.C. 154(b) by 6 days.

(21) Appl. No.: 18/270,482

(22) PCT Filed: Dec. 29, 2021

(86) PCT No.: PCT/CN2021/142349
§ 371 (c)(1),
(2) Date: Jun. 30, 2023

(87) PCT Pub. No.: WO2022/143734
PCT Pub. Date: Jul. 7, 2022

(65) Prior Publication Data
US 2024/0060568 A1 Feb. 22, 2024

(30) Foreign Application Priority Data
Dec. 30, 2020 (CN) .......................... 202011627567.3

(51) Int. Cl.
*F16K 1/46* (2006.01)
*F16K 1/42* (2006.01)
(Continued)

(52) U.S. Cl.
CPC ................ *F16K 1/465* (2013.01); *F16K 1/42* (2013.01); *F16K 1/487* (2013.01); *F16K 31/004* (2013.01)

(58) Field of Classification Search
CPC . F16K 1/465; F16K 1/42; F16K 1/487; F16K 1/02; F16K 1/32; F16K 1/36;
(Continued)

(56) References Cited

U.S. PATENT DOCUMENTS 3,318,577 A 5/1967 Banks
4,027,851 A 6/1977 Schlotman
(Continued)

FOREIGN PATENT DOCUMENTS

CN 204630192 U 9/2015
CN 208764430 U 4/2019
(Continued)

OTHER PUBLICATIONS

International Search Report for PCT/CN2021/142349 mailed Mar. 25, 2022, ISA/CN.
(Continued)

*Primary Examiner* — Patrick C Williams
(74) *Attorney, Agent, or Firm* — Yue (Robert) Xu; Apex Attorneys at Law, LLP (57) ABSTRACT An electric valve, comprising a lead screw and a valve element assembly, wherein the lead screw has an external thread section, the valve element assembly has an internal thread section, the valve element assembly and the lead screw are in threaded connection by the fitting of the internal thread section and the external thread section, and at least the portion of the valve element assembly corresponding to the internal thread section is made of a material including a plastic material. Due to the portion of the valve element assembly corresponding to the internal thread section being
(Continued)

made of a material including a plastic material, compared with two metal parts, a lead screw and a valve element being in direct threaded connection, the thread wear is reduced, and the service life of the electric valve is prolonged.

11 Claims, 10 Drawing Sheets

(51) Int. Cl.
  *F16K 1/48* (2006.01)
  *F16K 31/00* (2006.01)
(58) Field of Classification Search
  CPC ...... F16K 31/004; F16K 31/508; F16K 31/04; F16K 39/022
  See application file for complete search history.

(56) References Cited

U.S. PATENT DOCUMENTS

| | | | |
|---|---|---|---|
| 2006/0005890 A1* | 1/2006 | Johnsen | F25B 41/35 137/630.15 |
| 2009/0045364 A1 | 2/2009 | Busato et al. | |
| 2012/0207014 A1* | 8/2012 | Saltsidis | H04L 43/065 370/218 |
| 2014/0175315 A1* | 6/2014 | Lv | F25B 41/34 251/282 |
| 2015/0285382 A1* | 10/2015 | Kienreich | F16K 51/02 251/333 |
| 2016/0195195 A1 | 7/2016 | Lv | |
| 2020/0284373 A1 | 9/2020 | Lv et al. | |
| 2020/0340596 A1 | 10/2020 | Lv et al. | |

FOREIGN PATENT DOCUMENTS

| | | | |
|---|---|---|---|
| CN | 109723826 A | 5/2019 |
| CN | 209012455 U | 6/2019 |
| CN | 110094513 A | 8/2019 |
| CN | 110094525 A | 8/2019 |
| CN | 110296222 A | 10/2019 |
| CN | 111765288 A | 10/2020 |
| EP | 1160493 A1 | 12/2001 |
| EP | 1724460 A1 | 11/2006 |
| JP | H09229225 A | 9/1997 |
| JP | 2009518587 A | 5/2009 |
| KR | 20180014210 A | 2/2018 |
| WO | 2019179518 A1 | 9/2019 |

OTHER PUBLICATIONS

The Korean 1st Office Action Issued on Jul. 10, 2024 for KR10-2023-7025063.
The Korean Notification of the submission of the observation Issued on Jan. 19, 2024 for KR10-2023-7025063.
The European Search Report Issued on Oct. 10, 2024 for EP21914466.4.

* cited by examiner

ELECTRIC VALVE

This application is the national phase of international patent application No. PCT/CN2021/142349, titled "ELECTRIC VALVE", filed on Dec. 29, 2021 which claims the benefit of priority to Chinese Patent Application No. 202011627567.3, titled "ELECTRIC VALVE", filed with the China National Intellectual Property Administration on Dec. 30, 2020, both of which are incorporated herein by reference.

FIELD

The present application relates to an electric component, and in particular to an electric valve.

BACKGROUND

In an air conditioning system or a thermal management system, an electric valve is generally used as a throttling element. The electric valve can perform forward or reverse throttling on the working fluid according to the requirements of different operating modes of the system. The electric valve includes a lead screw and a valve core. The inventor has known a structure in which a metal lead screw is threadedly connected with a metal valve core and the lead screw can drive the valve core to linearly reciprocate under the action of the thread. However, in the long run, the threads of the lead screw and the valve core in this structure are easy to wear, reducing the service life of the electric valve.

SUMMARY

It is an object of the present application to provide an electric valve which is beneficial to reducing the thread wear and improving the service life of the electric valve.

To achieve the above object, the following technical solution is provided according to the present application.

An electric valve includes a valve component, wherein the valve component includes a lead screw and a valve core assembly, the lead screw is threadedly connected with the valve core assembly, the valve component is provided with a valve port, and the lead screw is configured to drive the valve core assembly to approach or move away from the valve port to adjust an opening degree of the valve port, wherein the valve core assembly includes an internal thread section, the lead screw is provided with an external thread section, the valve core assembly is threadedly connected with the lead screw by means of the fitting of the internal thread section and the external thread section, and a material of at least a portion, corresponding to the internal thread section, of the valve core assembly includes a plastic material.

The electric valve according to the present application includes the lead screw and the valve core assembly. The lead screw is provided with the external thread section. The valve core assembly is provided with the internal thread section. The valve core assembly is threadedly connected with the lead screw by means of the fitting of the internal thread section and the external thread section. A material of at least a portion, corresponding to the internal thread section, of the valve core assembly includes a plastic material. Compared with the scheme where a metal lead screw is directly threadedly connected with a metal valve core, the thread wear is reduced and the service life of the electric valve is prolonged due to the arrangement that a material of the portion, corresponding to the internal thread section, of the valve core assembly includes a plastic material.

DETAILED DESCRIPTION OF THE EMBODIMENTS

The present application will be described in detail hereinafter in conjunction with the drawings and specific embodiments.

Figure 1:
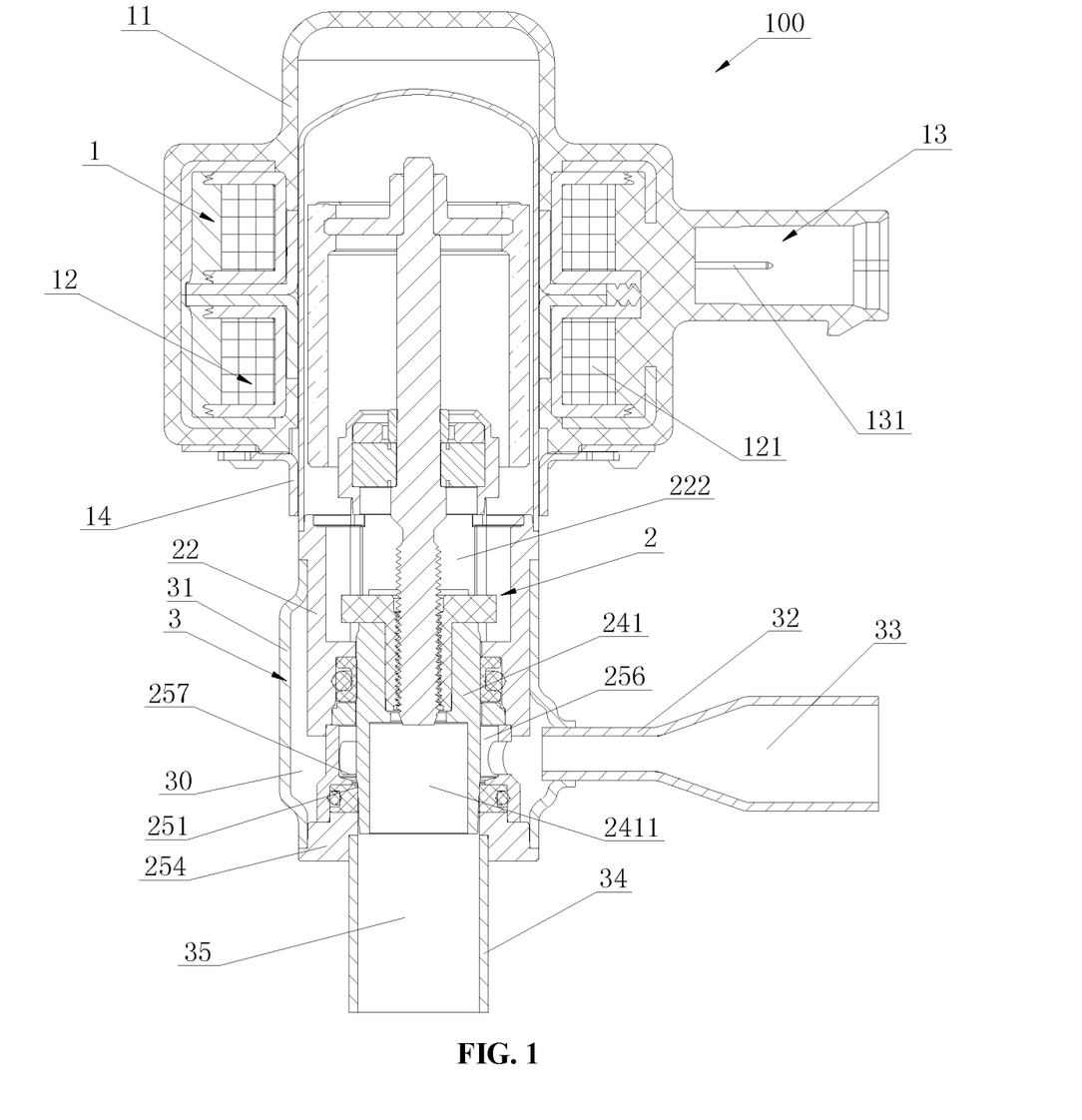
FIG. 1 is a schematic cross-sectional view of a first embodiment of an electric valve.

Referring to FIG. 1, an electric valve 100 includes a driving component 1, a valve component 2 and a valve body component 3. A part of the valve component 2 is located in a valve body cavity 30 formed by the valve body component 3, and the valve component 2 is connected with the valve body component 3. The driving component 1 is located at an outer periphery of the valve component 2, and the driving component 1 is connected with the valve component 2. The electric valve 100 is electrically and/or signal connected with an external environment through the driving component 1.

Referring to FIG. 1, the driving component 1 includes a housing body 11, a stator assembly 12 and a connecting port portion 13. The stator assembly 12 includes a coil winding 121. The connecting port portion 13 includes a first pin 131. In this embodiment, the housing body 11 is integrally formed by injection molding with the coil winding 121 and the first pin 131 being used as injection molding inserts. The connecting port portion 13 is integrally formed with the housing body 11 by injection molding. One end of the first pin 131 is electrically connected with the coil winding 121, and another end of the first pin 131 is located in an inserting cavity formed by the connecting port portion 13 for electrical connection with the external environment. As an alternative embodiment, the connection between the connecting port portion 13 and the housing body 11 may be achieved by assembling and fixing. In this embodiment, the driving component 1 further includes a snap-fit portion 14. The snap-fit portion 14 is fixedly connected with the housing body 11, and the driving component 1 is connected with the valve component 2 through the snap-fit portion 14.

Figure 2:
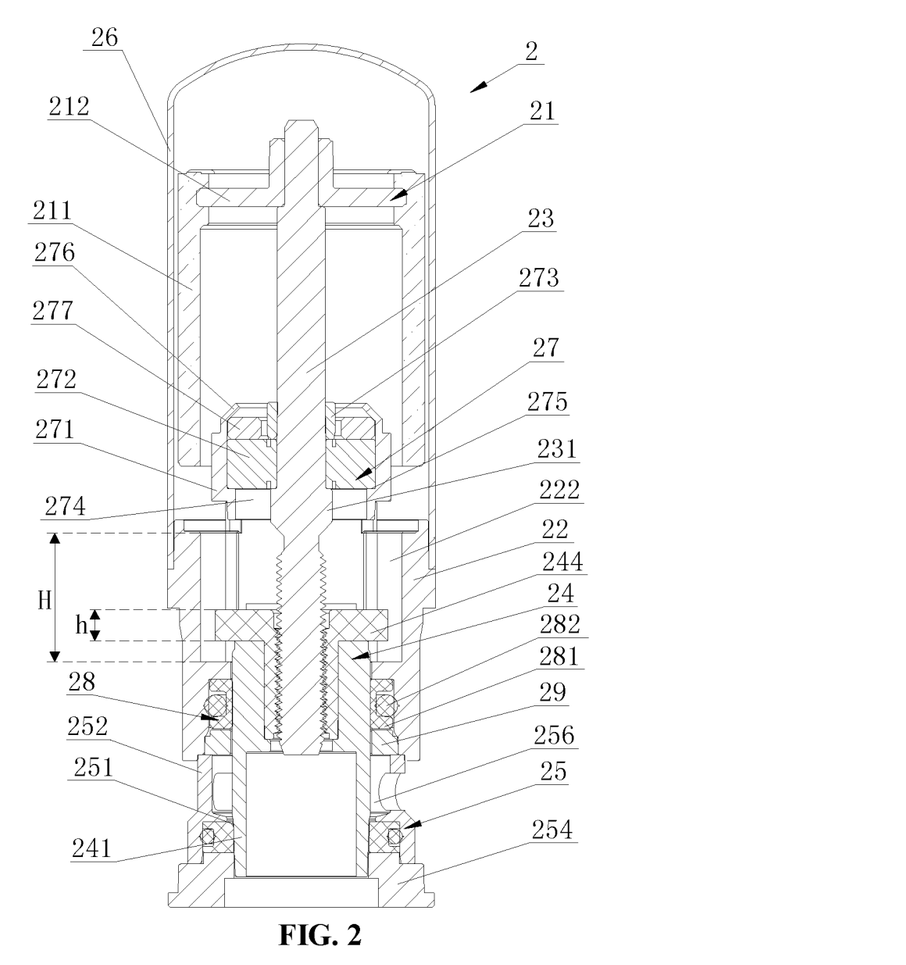
FIG. 2 is a schematic cross-sectional view of a valve component in FIG. 1.
Figure 3:
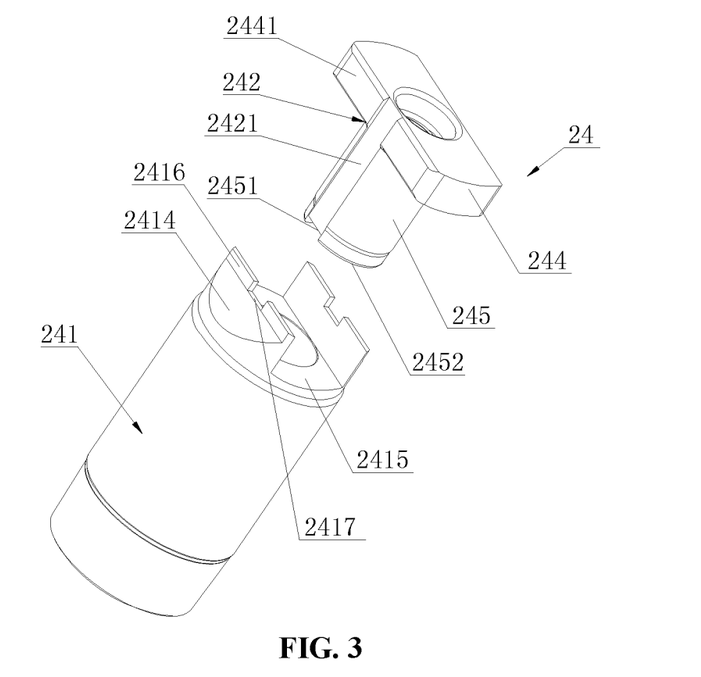
FIG. 3 is a schematic exploded view of a valve core assembly of the first embodiment of the electric valve.
Figure 4:
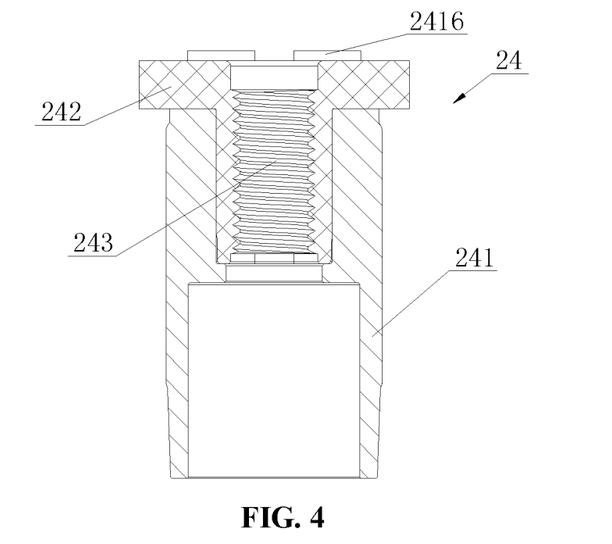
FIG. 4 is a schematic cross-sectional view of the valve core assembly in FIG. 1.
Figure 5:
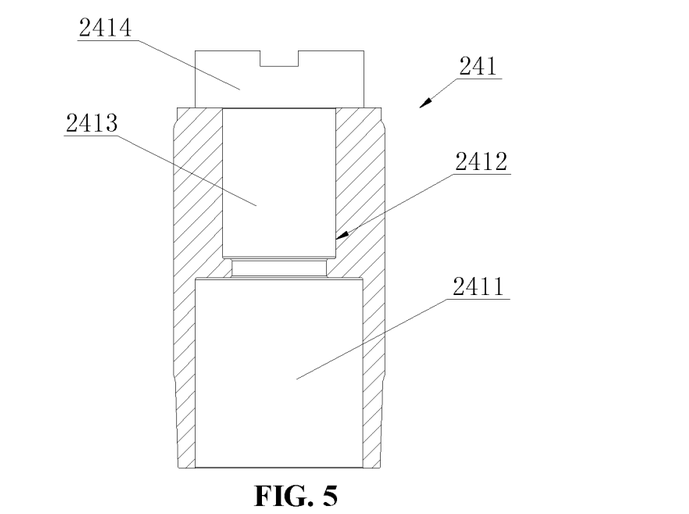
FIG. 5 is a schematic cross-sectional view of a valve core in FIG. 4.
Figure 6:
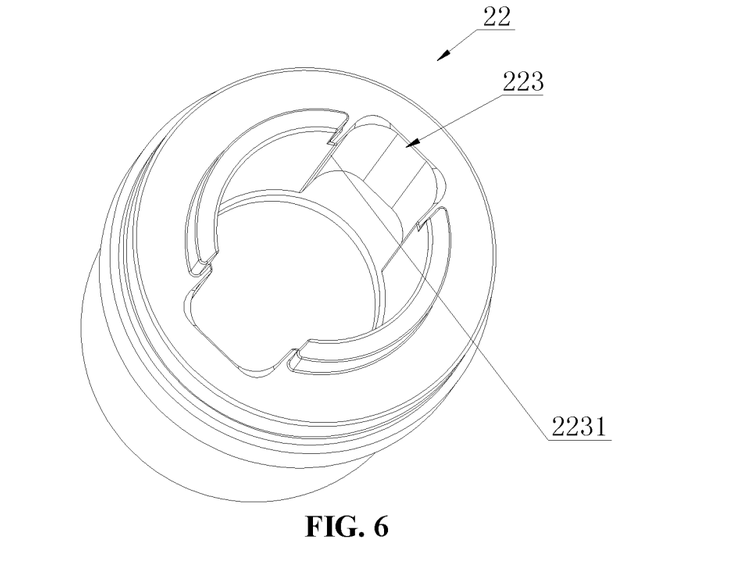
FIG. 6 is a schematic perspective view of a connecting seat of the first embodiment of the electric valve.

Referring to FIG. 2, the valve component 2 includes a rotor assembly 21, a connecting seat 22, a lead screw 23, a valve core assembly 24, a valve core seat assembly 25 and a sleeving pipe 26. The rotor assembly 21 is fixedly connected with one end of the lead screw 23, and another end of the lead screw 23 is threadedly connected with the valve core assembly 24. The connecting seat 22 covers a part of the lead screw 23 and a part of the valve core assembly 24. The valve core seat assembly 25 covers a part of the valve core assembly 24. The connecting seat 22 is fixedly connected with the valve core seat assembly 25. The sleeving pipe 26 is located at an outer periphery of the rotor assembly 21, and the sleeving pipe 26 is fixedly connected with the connecting seat 22. The valve core seat assembly 25 includes a valve port portion which forms a valve port 251. The valve core assembly 24 includes a valve core 241. The rotor assembly 21 can drive the valve core 241 to linearly reciprocate along an axial direction of the valve component 2 through the lead screw 23, and the valve core 241 can approach or move away from the valve port 251 during movement, so that the valve port 251 can be throttled, opened, or closed.

Referring to FIG. 2 to FIG. 5, the rotor assembly 21 includes a rotor 211 and a connecting member 212. The rotor 211 is fixedly connected with the connecting member 212, and the connecting member 212 is fixedly connected with one end of the lead screw 23. In this embodiment, the rotor 211 is formed by injection molding with the connecting member 212 being used as an injection mold insert, and the rotor 211 is fixed to the connecting member 212 by injection molding. The connecting member 212 may be fixed to the lead screw 23 by interference fit, welding, or gluing. The valve core assembly 24 further includes a nut member 242. The nut member 242 is made of a plastic material. The nut member 242 may be integrally formed by injection molding. The valve core 241 covers a part of the nut member 242, and the valve core 241 is fixedly connected with the nut member 242. Specifically, the nut member 242 may be fixed to the valve core 241 by interference fit, gluing, injection molding, or crimping. In this embodiment, the valve core 241 is provided with a first hole passage 2411. The valve core 241 includes a first mounting portion 2412, and the first mounting portion 2412 forms a first mounting cavity 2413. For the valve core 241, the first mounting cavity 2413 is in communication with the first hole passage 2411. The nut member 242 includes a limiting portion 244 and a threaded portion 245 which are integrally formed by injection molding. The nut member 242 is substantially T-shaped. The threaded portion 245 is located in the first mounting cavity 2413, and the threaded portion 245 is in an interference fit with the first mounting portion 2412 to achieve the fixed connection between the nut member 242 and the valve core 241. Further, in order to strengthen the fixed connection between the valve core 241 and the nut member 242, the valve core 241 further includes first crimping portions 2414. Along an axial direction of the valve core 241, the first crimping portions 2414 are higher than the first mounting portion 2412. Along a radial direction of the valve core 241, the first crimping portions 2414 are located on two sides of the first mounting portion 2412 and may be symmetrically distributed. A first stepped portion 2415 is formed between the first crimping portions 2414 and the first mounting portion 2412. Crimping protrusions 2416 for crimping are provided on each first crimping portion 2414, and the crimping protrusions 2416 are spaced apart. A crimping groove 2417 is formed between two adjacent crimping protrusions 2416, and the crimping groove 2417 is configured to achieve the communication of the balance passage hereinafter. The threaded portion 245 is located in the first mounting cavity 2413, and the threaded portion 245 is in an interference fit with the first mounting portion 2412. The limiting portion 244 abuts against the first stepped portion 2415, and the crimping protrusions 2416 are bent and pressed against the limiting portion 244, so that the limiting portion 244 is secured tightly between the crimping protrusions 2416 and the first stepped portion 2415, thus achieving the fixed connection between the nut member 242 and the valve core 241. The nut member 242 is further provided with a threaded hole 243 which extends through the nut member 242. A peripheral side wall forming the threaded hole 243 is provided with the internal thread section. Correspondingly, another end of the lead screw 23 is provided with the external thread section which is meshed with the internal thread section. The lead screw 23 extends into the threaded hole 243, so that the external thread section of the lead screw 23 is in a thread fit with the internal thread section of the nut member 242, thus achieving the threaded connection between the lead screw 23 and the valve core assembly 24. The lead screw 23 is threadedly connected with the nut member 242 with the nut member 242 being made of a plastic material, which, compared with the direct threaded connection between two metal members of the lead screw 23 and the valve core 241, reduces the thread wear.

Referring to FIG. 2, FIG. 3, FIG. 6 and FIG. 7, the connecting seat 22 includes a first accommodating portion 221 which forms a first accommodating cavity 222. A part of the lead screw 23 and a part of the valve core assembly 24 are located in the first accommodating cavity 222. The first accommodating portion 221 includes a fitting portion 223. The limiting portion 244 is located in the first accommodating cavity 222, and the limiting portion 244 is a non-rotating body. The limiting portion 244 cooperates with the fitting portion 223 to limit circumferential rotation of the valve core assembly 24. The limiting portion 244 and the fitting portion 223 may have various structures, as long as these structures can limit the circumferential rotation of the valve core assembly 24. In this embodiment, the limiting portion 244 includes a limiting portion side surface 2441. Correspondingly, the fitting portion 223 includes a fitting portion side surface 2231. The limiting portion 244 is located in the first accommodating cavity 222, so that the limiting portion side surface 2441 abuts against the fitting portion side surface 2231 to limit the circumferential rotation of the valve core assembly 24. It should be noted that, in order to enable the valve core assembly 24 to linearly reciprocate along an axis of the valve component 2, an axial height H of the fitting portion 223 is arranged to be larger than an axial height h of the limiting portion 244. Specifically, a proportional relationship between the axial height H of the fitting portion 223 and the axial height h of the limiting portion 244 can be designed and determined according to a specific movement stroke of valve core assembly 24. For example, in this embodiment, the axial height H of the fitting portion 223 is 4.2 times the axial height h of the limiting portion 244.

Referring to FIG. 2, the valve component 2 further includes a supporting assembly 27. Specifically, the supporting assembly 27 includes a supporting frame 271, a bearing 272 and a sleeve 273. The supporting frame 271 is provided with a placement cavity 274, the supporting frame 271 is fixedly connected with the connecting seat 22, and the placement cavity 274 is in communication with the first accommodating cavity 222. In this embodiment, the supporting frame 271 is fixed to the connecting seat 22 by welding. Alternatively, the supporting frame 271 may be fixed to the connecting seat 22 by other methods such as interference fit or gluing. In addition, the supporting frame 271 and the connecting seat 22 may be integrally formed. A part of the lead screw 23 is located in the placement cavity 274. The bearing 272 is located at an outer periphery of the lead screw 23. The bearing 272 is located in the placement cavity 274, and the bearing 272 is fixedly connected with the supporting frame 271. Specifically, the supporting frame 271 includes a second stepped portion 275 and a second crimping portion 276. The bearing 272 abuts against the second stepped portion 275, and the second crimping portion 276 is bent and pressed against the bearing 272, so that the bearing 272 is secured tightly between the second crimping portion 276 and the second stepped portion 275, thus achieving the fixation between the bearing 272 and the supporting frame 271. Further, in order to prevent the second crimping portion 276 from damaging the bearing 272 during crimping, the supporting assembly 27 further includes a first retaining ring 277. The first retaining ring 277 is located at the outer periphery of the lead screw 23 and is located in the placement cavity 274. Along an axial direction of the supporting assembly 27, the bearing 272 is located between the first retaining ring 277 and the second stepped portion 275, and the first retaining ring 277 is closer to the second crimping portion 276 than the second stepped portion 275. During crimping, the second crimping portion 276 is bent and pressed against the first retaining ring 277, so that the bearing 272 is secured tightly between the second stepped portion 275 and the first retaining ring 277, thus achieving the fixation of the bearing 272. The sleeve 273 is located at the outer periphery of the lead screw 23, at least part of the sleeve 273 is located in the placement cavity 274, and the sleeve 273 is fixedly connected with the lead screw 23. Specifically, the sleeve 273 is fixed to the lead screw 23 by interference fit, welding or gluing. The lead screw 23 includes a shoulder 231. The shoulder 231 protrudes outward along a radial direction of the lead screw 23. Along an axial direction of the lead screw 23, the bearing 272 is located between the sleeve 273 and the shoulder 231, and the shoulder 231 is closer to the connecting seat 22 than the sleeve 273. The lead screw 23 is axially limited by the shoulder 231 and the sleeve 273. Specifically, when the lead screw 23 is assumed to move axially away from the connecting seat 22, the lead screw 23 abuts against the bearing 272 through the shoulder 231 to limit a movement of the lead screw 23. When the lead screw 23 is assumed to move axially close to the connecting seat 22, the lead screw 23 abuts against the bearing 272 through the sleeve 273 to limit the movement of the lead screw 23.

Figure 7:
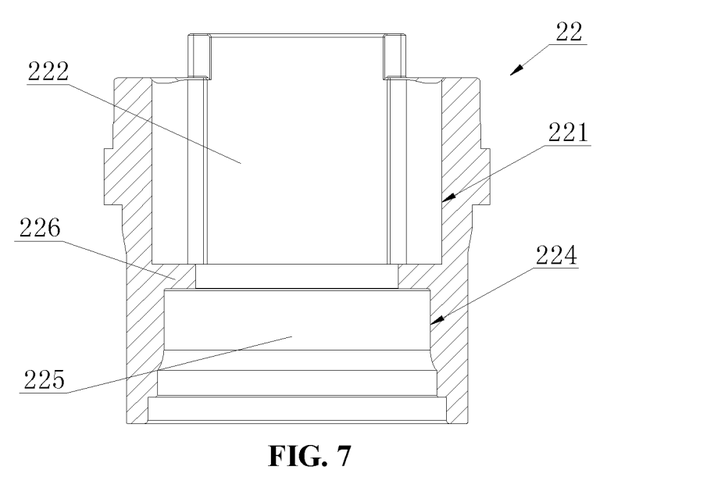
FIG. 7 is a schematic cross-sectional view of the connecting seat in FIG. 6.
Figure 8:
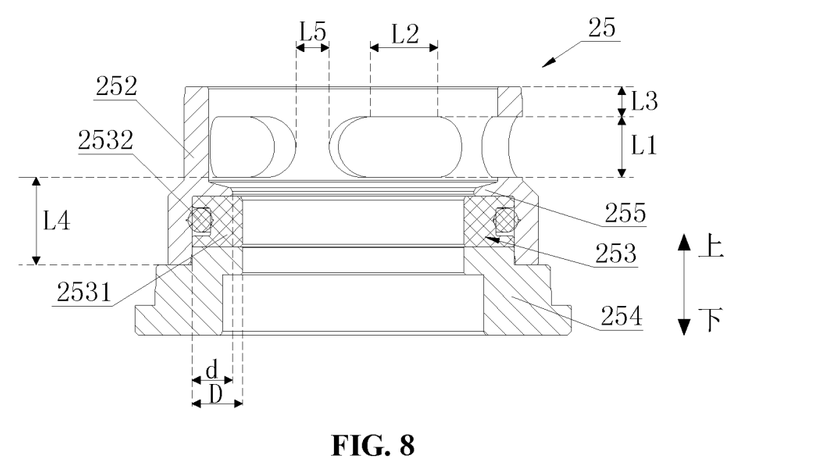
FIG. 8 is a schematic cross-sectional view of a valve core seat assembly in FIG. 1.

Referring to FIG. 2, FIG. 7 and FIG. 8, the connecting seat 22 further includes a second accommodating portion 224 which forms a second accommodating cavity 225. For the sole connecting seat 22, the second accommodating cavity 225 is in communication with the first accommodating cavity 222. A part of the valve core seat assembly 25 is located in the second accommodating cavity 225. The valve core seat assembly 25 may be fixedly connected to the connecting seat 22 by interference fit, welding, or gluing. The valve core seat assembly includes a valve core seat 252, a first sealing assembly 253 and a fixed seat 254. The first sealing assembly 253 includes a first sealing ring 2531 and a first sealing member 2532. The first sealing ring 2531 may be integrally formed by injection molding of polyether ether ketone (PEEK). Alternatively, the first sealing ring 2531 may be made of other plastic material with both required hardness and elasticity. The valve core seat 252 is provided with a valve core cavity 256. A part of the fixed seat 254 is located in the valve core cavity 256. The fixed seat 254 is fixedly connected with the valve core seat 252, specifically by interference fit, welding or gluing. Referring to FIG. 2, a part of the valve core seat 252 is located in the second accommodating cavity 225 of the connecting seat 22, and the valve core seat 252 is fixedly connected with the connecting seat 22. Along the axial direction of the valve component 2, the valve core seat 252 is located between the connecting seat 22 and the fixed seat 254. The fixed seat 254 is fixedly assembled with the valve core seat 252 to form an accommodating groove, and a part of the first sealing assembly 253 is located in the accommodating groove. Specifically, the first sealing member 2532 and a part of the first sealing ring 2531 are located in the accommodating groove. The first sealing ring 2531 includes a first recess, and a part of the first sealing member 2532 is located in a first recessed cavity formed by the first recess. Along a radial direction of the first sealing assembly 253, the first sealing member 2532 is secured tightly between the first recess and an inner side wall surface of the valve core seat 252, and the first sealing member 2532 is in a sealed state. As an alternative embodiment, the first sealing ring 2531 may not include a first recess, that is, the first sealing member 2532 is directly secured tightly between an outer side wall of the first sealing ring 2531 and the inner side wall surface of the valve core seat 252. It should be noted that the sealing method of the first sealing member 2532 is not limited to the above methods, as long as a seal can be formed to avoid internal leakage between the valve core seat 252 and the fixed seat 254. Referring to FIG. 8, the valve core seat 252 further includes a protrusion 255. The protrusion 255 protrudes inward along a radial direction of the valve core seat 252. Along an axial direction of the valve core seat assembly 25, the first sealing assembly 253 is located between the protrusion 255 and an end surface of the fixed seat 254, and the first sealing assembly 253 is axially limited by the protrusion 255 and the end surface of the fixed seat 254. It should be noted that, the "being axially limited" includes a case where the first sealing assembly 253 is clamped and fixed between the protrusion 255 and the fixed seat 254.

Referring to FIG. 2 and FIG. 8, a part of the valve core 241 is located in the valve core cavity 256, and the first sealing assembly 253 is located at the outer periphery of the valve core 241. Specifically, the first sealing ring 2531 is located at the outer periphery of the valve core 241. A radial width d of the protrusion 255 is arranged to be smaller than a radial width D of a cross section of the first sealing ring 2531, or in other words, the first sealing ring 2531 is arranged to be closer to the valve core 241 than the protrusion 255 along a radial direction of the valve core seat assembly 25, so that the valve core 241 can abut against the first sealing ring 2531 when the valve core 241 linearly reciprocates along an axial direction in the valve core cavity 256, and a seal is formed between the valve core 241 and the first sealing ring 2531. That is, in this embodiment, the first sealing ring 2531 includes a valve port portion which forms a valve port 251. Compared with forming the valve port by a metal member, when the electric valve 100 is closed, a better seal can be formed between the valve core 241 and the valve port portion by arranging the first sealing ring 2531 to form the valve port 251, which is beneficial to reducing the internal leakage.

Referring to FIG. 2 and FIG. 7, the valve component 2 further includes a second sealing assembly 28 and a second retaining ring 29. The second sealing assembly 28 is located at the outer periphery of the valve core 241, the second retaining ring 29 is located at the outer periphery of the valve core 241, and both the second sealing assembly 28 and the second retaining ring 29 are located in the second accommodating cavity 225 of the connecting seat 22. The second retaining ring 29 is fixedly connected with the connecting seat 22. Specifically, the second retaining ring 29 may be fixedly connected to the connecting seat 22 by interference fit, welding or gluing. The connecting seat 22 forms a boss portion 226 between the first accommodating portion 221 and the second accommodating portion 224. Along the axial direction of the valve component 2, the second sealing assembly 28 is located between the boss portion 226 and the second retaining ring 29, and the second retaining ring 29 is closer to the second sealing assembly 28 than the valve core seat 252. The second sealing assembly 28 is axially limited by the boss portion 226 and the second retaining ring 29. The second sealing assembly 28 includes a second sealing ring 281 and a second sealing member 282. A material of the second sealing ring 281 may be the same as a material of the first sealing ring 2531. The second sealing ring 281 is located at the outer periphery of the valve core 241, and the second sealing ring 281 is in an interference fit with the valve core 241, so that the second sealing ring 281 is in close contact with an outer surface of the valve core 24 to seal the valve core 24. The second sealing ring 281 includes a second recess. A part of the second sealing member 282 is located in a second recessed cavity formed by the second recess. Along a radial direction of the second sealing assembly 28, the second sealing member 282 is secured tightly between the second recess and an inner side wall of the second accommodating portion 224, and the second sealing member 282 is in a sealed and pressed state.

Referring to FIG. 1 and FIG. 2, the valve body component 3 includes a main valve body 31, a first connecting pipe 32 and a second connecting pipe 34. The main valve body 31 forms a valve body cavity 30. A part of the valve component 2 is located in the valve body cavity 30, and the valve component 2 is fixedly connected with the main valve body 31. Specifically, the valve component 2 is fixedly connected with the valve body component 3 by interference fit, snap-fit, welding or gluing. In this embodiment, the valve component 2 is fixed to the main valve body 31 by welding. Specifically, one end of the main valve body 31 is fixed to the connecting seat 22 by welding, and another end of the main valve body 31 is fixed to the fixed seat 254 by welding. The first connecting pipe 32 is fixed to the main valve body 31 by welding. The first connecting pipe 32 forms a first flow passage 33, and the first flow passage 33 is in communication with the valve body cavity 30. The second connecting pipe 34 is fixed to the fixed seat 254 by welding. The second connecting pipe 34 forms a second flow passage 35, and the second flow passage 35 is in communication with the first hole passage 2411 of the valve core 241. As an alternative embodiment, the second connecting pipe 34 may be fixed to the main valve body 31 also by welding. With the axial linear movement of the valve core 241, the opening, closing and throttling of the first flow passage 33 and the second flow passage 35 can be achieved via the valve port 251. Specifically, when the driving component 1 is energized, the driving component 1 generates an excitation magnetic field through the stator assembly 12. The rotor assembly 21 is fixedly connected with the lead screw 23, and the rotor assembly 21 drives the lead screw 23 to rotate under the magnetic field excitation of the stator assembly 12. The lead screw 23 is threadedly connected with the valve core assembly 24, the lead screw 23 is axially limited by the bearing 272, the circumferential rotation of the valve core assembly 24 is limited by the connecting seat 22, and the connecting seat 22 is fixed to the valve body component 3, so that the valve core 241 can linearly reciprocate along the axial direction of the valve component 2 under the action of thread. When linearly reciprocating along the axial direction, the valve core 241 can adjust the opening degree of the valve port 251 by approaching or moving away from the valve port 251, thereby forming throttling, opening, or closing at the valve port 251. In this way, the opening, closing and throttling of the first flow passage 33 and the second flow passage 35 can be achieved via the valve port 251. In addition, in this embodiment, the linear movement stroke of the valve core 241 is delimited by the shoulder 231 of the lead screw 23 and the valve port portion. That is, when the valve core 241 moves linearly upward along the axial direction of the valve component 2, the valve core 241 is limited by the abutment between the limiting portion 244 and the shoulder 231; and when the valve core 241 moves linearly downward along the axial direction of the valve component 2, the valve core 241 is limited by the abutment between the valve core 241 and the valve port portion.

Figure 9:
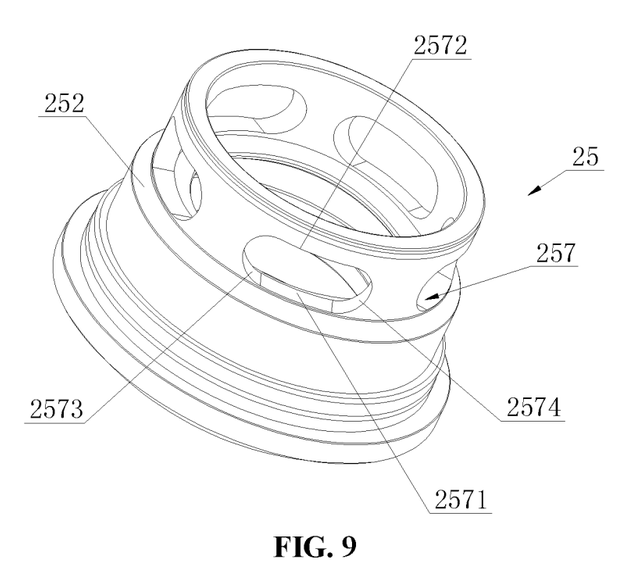
FIG. 9 is a schematic perspective view of the valve core seat assembly of the first embodiment of the electric valve.

Referring to FIG. 8 and FIG. 9, the valve core seat 252 further includes at least two through hole portions 257. The through hole portions 257 are uniformly distributed on an outer peripheral wall of the valve core seat 252. The through hole portions 257 extend through the outer peripheral wall of the valve core seat 252. Hole cavities formed by the through hole portions 257 are in communication with the valve core cavity 256. A flow area of the hole cavities formed by the through hole portions 257 is larger than a flow area formed by the valve port 251. The through hole portions 257 are substantially elongated holes. Each through hole portion 257 includes a first section 2571, a second section 2572, a third section 2573 and a fourth section 2574. The first section 2571 and the second section 2572 are distributed along the axial direction of the valve core seat 252, and the first section 2571 is further from to an upper end surface of the valve core seat 252 than the second section 2572 along the axial direction of the valve core seat 252. The third section 2573 and the fourth section 2574 are respectively located on two sides of the first section 2571 and the second section 2572, and the third section 2573 and the fourth section 2574 are symmetrically distributed. A plane which is parallel to a central axis of the valve core seat 252 is defined. Along the axial direction of the valve core seat 252, a maximum axial distance of projections of the first section 2571 and the second section 2572 on the plane is L1. Along the radial direction of the valve core seat 252, a minimum radial distance of projections of the third section 2573 and the fourth section 2574 on the plane is L2. L1<L2.

In this embodiment, specifically, the first section 2571 is a first flat arc section, the second section 2572 is a second flat arc section, the third section 2573 is a first circular arc section, and the fourth section 2574 is a second circular arc section. Surfaces of the first flat arc section and the second flat arc section are flat arc surfaces, and surfaces of the first circular arc section and the second circular arc section are circular arc surfaces. Along the axial direction of the valve core seat 252, the first flat arc section and the second flat arc section are parallel; and the first circular arc section and the second circular arc section are located on two sides of the first flat arc section and the second flat arc section, and are symmetrically distributed. One end of the first flat arc section is connected with one end of the first circular arc section, the other end of the first flat arc section is connected with one end of the second circular arc section, the other end of the first circular arc section is connected with one end of the second flat arc section, and the end of the second flat arc section is connected with the other end of the second circular arc section. Arranging the through hole portions 257 as elongated holes is beneficial to reducing the axial height of the valve core seat 252 while maintaining the flow area, and thus is beneficial to reducing the axial height of the electric valve 100.

In addition, since the through hole portions 257 are uniformly distributed on the outer peripheral wall of the valve core seat 252, in order to ensure the connecting strength of the through hole portions 257, along the axial direction of the valve core seat 252, a minimum axial distance of projections of the second section 2572 and the upper end surface of the valve core seat 252 on the plane is L3, a minimum axial distance of projections of the first section 2571 and a lower end surface of the valve core seat 252 on the plane is L4, L4>L3, and L3≥1.5 mm. Along a circumferential direction of the outer peripheral wall of the valve core seat 252, a partition is formed between adjacent through hole portions. Along the radial direction of the valve core seat 252, a minimum radial distance of projection of the partition on the plane is L5, and L5≥1.5 mm.

Referring to FIG. 1, during the operation of the electric valve 100, in a case that the first flow passage 33 is used as an inlet flow passage of the working fluid, the second flow passage 35 is used as an outlet flow passage of the working fluid, and the flow direction of the fluid in this case is defined as forward. The high-pressure working fluid flows into the valve body cavity 30 from the first flow passage 33, flows into the valve core cavity 256 after flowing through the hole cavities formed by the through hole portions 257, and is throttled by the valve port 251 to become the low-pressure working fluid. The low-pressure working fluid flows out from the second flow passage 35 and flows to subsequent system circuits. It should be noted that, arranging the through hole portions 257 to be uniformly distributed on the outer peripheral wall of the valve core seat 252 is beneficial to balancing the radial impact of the high-pressure working fluid on the valve core 241 when it flows in from the first flow passage 33, and is beneficial to the stable operation of the valve core 241.

Referring to FIG. 1, in a case that the second flow passage 35 is used as the inlet flow passage of the working fluid, the first flow passage 33 is used as the outlet flow passage of the working fluid, and the flow direction of the fluid is defined as reverse. When the high-pressure working fluid flows in from the second flow passage 35, the fluid may act on a free end of the valve core 241 and generate an axially upward force on valve core 241, and as a result the valve port 251 is not tightly closed by the valve core 241, or the output torque of the driving component 1 needs to be increased to drive the valve core 241 to move. In order to eliminate or damp the pressure action of the high-pressure working fluid on the valve core 241 and ensure the stable operation of the valve core assembly 24, the electric valve 100 further includes a balance passage. Specifically, referring to FIG. 3, in this embodiment, the nut member 242 further includes a groove portion 2421. Along a radial direction of the nut member 242, the groove portion 2421 is recessed inward from an outer side wall surface of the nut member 242. Along an axial direction of the nut member 242, one end of the groove portion 2421 extends to a free end surface of the limiting portion 244, and is flush with the free end surface of the limiting portion 244; and another end of the groove portion 2421 extends to a first end surface 2451 of the threaded portion 245 and is flush with the first end surface 2451. The threaded portion 245 further includes a second end surface 2452. Along the axial direction of the nut member 242, the second end surface 2452 is higher than the first end surface 2451, and the second end surface 2452 and the first end surface 2451 are alternately distributed along a circumference of the threaded portion 242. The number of the groove portion 2421 is at least one. In this embodiment, the number of the groove portion 2421 is two, and the two groove portions 2421 are symmetrically arranged on the outer side wall of the nut member 242. Referring to FIG. 3, FIG. 5, FIG. 10 and FIG. 11, when the nut member 242 is assembled with and fixed to the valve core 241, at least part of the threaded portion 245 is located in the first mounting cavity 2413 of the valve core 241, the groove portion 2421 of the nut member 242 is assembled with the first mounting portion 2412 of the valve core 241 to form a balance groove cavity 2423, and the first hole passage 2411 is in communication with the first accommodating cavity 222 through the balance groove cavity 2423. Specifically, the balance groove cavity 2423 is in communication with the first accommodating cavity 222 through a gap formed by the crimping groove 2417. The balance groove cavity 2423 is in communication with the first hole passage 2411 through a gap formed between the first end surface 2451 and the second end surface 2452. It should be noted that, as an alternative embodiment, the threaded portion 245 may not include a second end surface 2452. The arrangement of the second end surface 2452 is to guide the fluid flowing through the balance groove cavity 2423. In addition, by defining a groove portion 2421 which cooperates with the first mounting portion 2412 to form a balance groove cavity 2423, on the outer side wall of the nut member 242 to achieve the balance passage, the strength of the nut member 242 under the action of high-pressure fluid is ensured.

Figure 10:
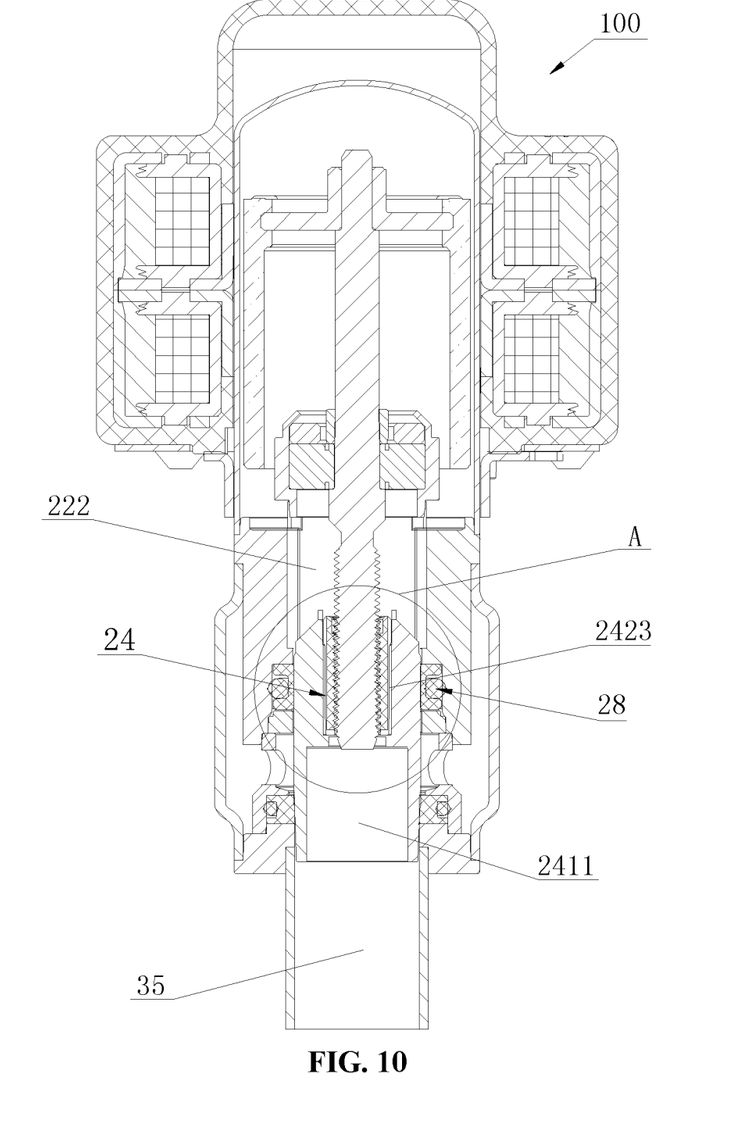
FIG. 10 is another schematic cross-sectional view of the first embodiment of the electric valve.
Figure 11:
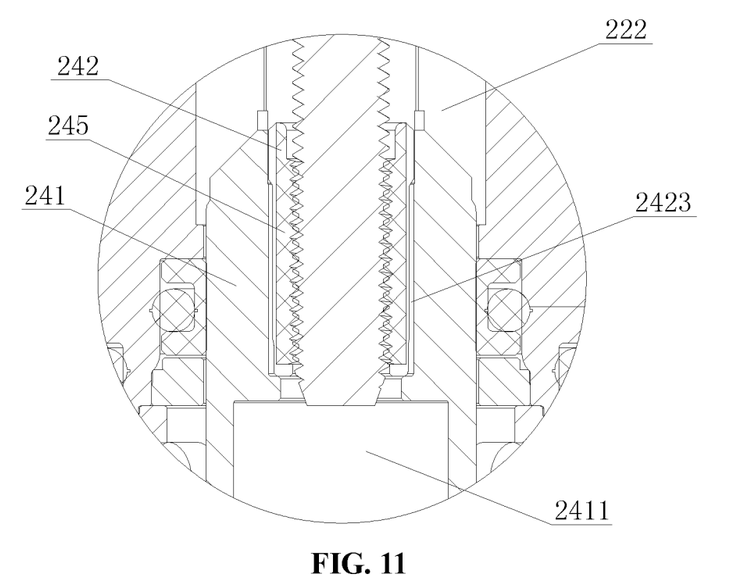
FIG. 11 is a schematic partially enlarged view of portion A in FIG. 10.

Referring to FIG. 1, FIG. 10 and FIG. 11, when the high-pressure fluid flows in from the second flow passage 35, part of the high-pressure fluid can flow into the first accommodating cavity 222 through the balance groove cavity 2423 after flowing through the first hole passage 2411, so that the high-pressure working medium can be located on a back-pressure side of the valve core assembly 24. The high-pressure fluid located in the first accommodating cavity 222 is sealed by the second sealing assembly 28, thus preventing the high-pressure fluid from being in communication with the low-pressure fluid after throttling located in the valve core cavity 256. The high-pressure working medium located in the first accommodating cavity 222 acts on the valve core assembly 24 and generates an axially downward force on the valve core assembly 24, so that the valve core assembly 24 is subjected to two opposite pressures in the axial direction, which is beneficial to balancing or almost balancing the force on the valve core assembly 24, and is beneficial to the stable operation of the valve core assembly 24. Part of the high-pressure fluid becomes the low-pressure fluid after being throttled by the valve port 251. The low-pressure fluid flows into the valve core cavity 256, then flows to the first flow passage 33 through the hole cavities formed by the through hole portions 257, and flows to the subsequent circuit. It should be noted that the provision of the balance groove cavity 2423 is beneficial to quickly balancing the pressures at two ends of the valve core assembly 24. As an alternative embodiment, the nut member 242 may not include a groove portion 2421. For example, the first hole passage 2411 is in communication with the first accommodating cavity 222 through a gap of the thread fit between the nut member 242 and the lead screw 23, or a through hole may be defined inside the nut member 242 while ensuring the strength of the nut member 242, so that the first hole passage 2411 is in communication with the first accommodating cavity 222 through the through hole. There are various forms to form a balance passage, as long as the first hole passage 2411 can be in communication with the first accommodating cavity 222.

Figure 12:
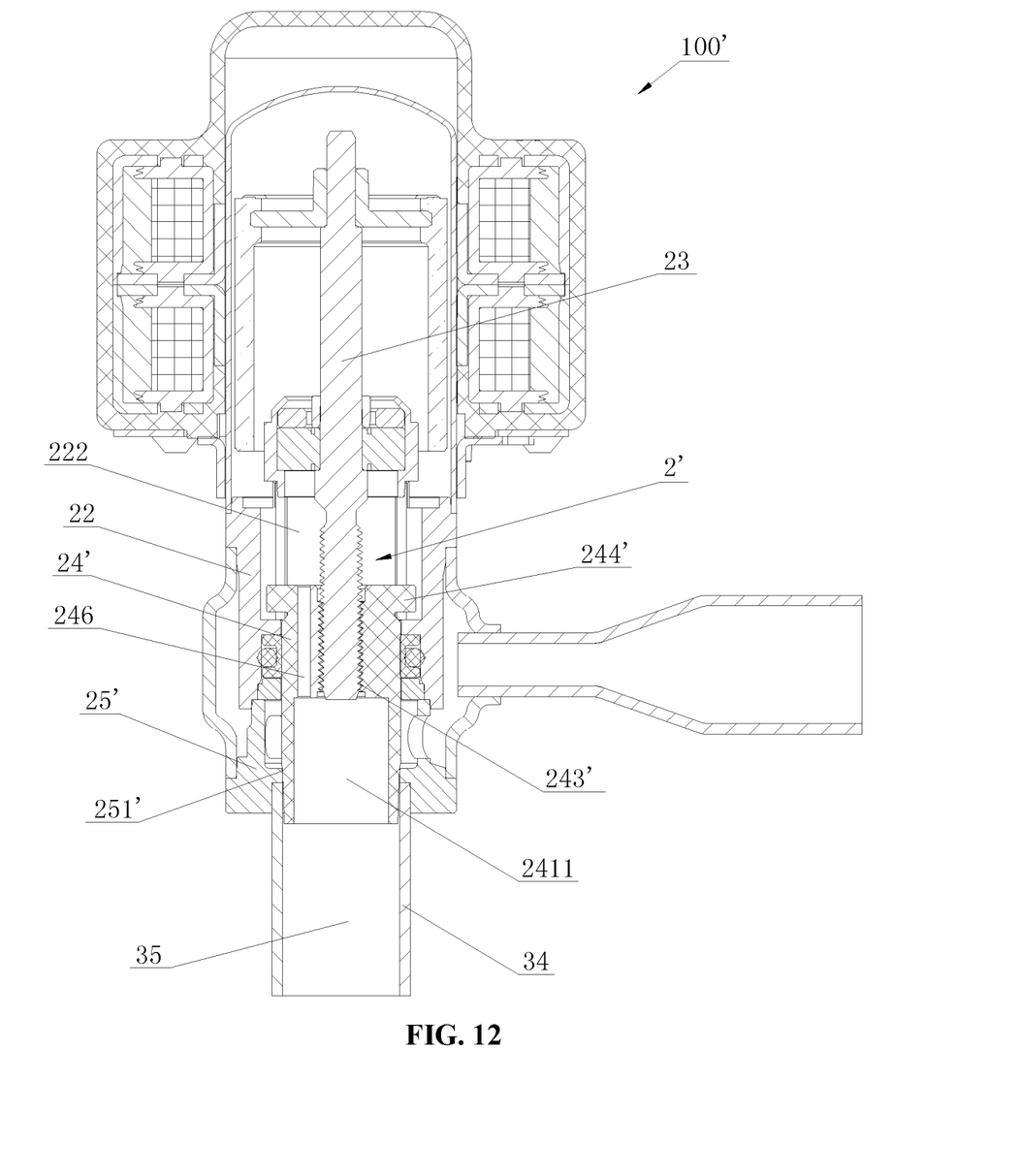
FIG. 12 is a schematic cross-sectional view of a second embodiment of the electric valve.

Referring to FIG. 12, FIG. 12 is a second embodiment of the electric valve. In the second embodiment, the valve component 2' includes a valve core 24' and a valve core seat 25'. The valve core 24' is made of a non-metallic material. In this embodiment, the valve core 24' is integrally formed by injection molding of polyether ether ketone (PEEK). Alternatively, the valve core 24' may be made of other plastic material with both required hardness and elasticity. The valve core 24' includes a limiting portion 244' which is located in the first accommodating cavity 222 of the connecting seat 22. The limiting portion 244' cooperates with the fitting portion of the connecting seat 22 to limit circumferential rotation of the valve core 24'. The structure of the limiting portion 244' may be the same as the structure of the limiting portion 244 in the first embodiment, and the limit fitting method between the limiting portion 244' and the fitting portion may be the same as the limit fitting method in the first embodiment, which will not described in detail herein. The valve core 24' is further provided with the first hole passage 2411 and a threaded hole 243'. For the single valve core 24', the first hole passage 2411 is in communication with the threaded hole 243'. A peripheral side wall forming the threaded hole 243' is provided with the internal thread section, and one end of the lead screw 23 is provided with the external thread section. The end of the lead screw 23 provided with the external thread section extends into the threaded hole 243' and is in a thread fit with the internal thread section of the valve core 24', thus achieving the threaded connection between the lead screw 23 and the valve core 24'. The valve core 24' is made of a plastic material (such as PEEK), which is beneficial to reducing the thread wear between the valve core 24' and the lead screw 23. The valve core seat 25' is a metal member and is integrally formed. The valve core seat 25' is located at an outer periphery of the valve core 24', and the valve core seat 25' is fixedly connected with the connecting seat 22, specifically by welding, interference fit, or gluing. The valve core seat 25' includes a valve port portion which forms a valve port 251'. When the valve core 24' linearly reciprocates along the axial direction of the valve component 2', the valve core 24' can approach or move away from the valve port 251', so that the valve port 251' can be throttled, opened, or closed. Since the valve core 24' is made of a non-metallic material (such as PEEK), a better seal can be formed between the valve core 24' and the valve port portion when the electric valve 100' is closed, which is beneficial to reducing internal leakage and simplifying the structure of the valve core seat 25'. In this embodiment, the valve core 24' is further provided with a balance through hole 246, and the number of the balance through hole 246 is at least one. The first hole passage 2411 is in communication with the first accommodating cavity 222 through the balance through hole 246. The second connecting pipe 34 is fixed to the valve core seat 25' by welding. The second connecting pipe 34 forms the second flow passage 35, and the second flow passage 35 is in communication with the first hole passage 2411. In this way, when the high-pressure fluid flows in from the second flow passage 35, part of the high-pressure fluid flows into the first accommodating cavity 222 through the balance through hole 246 after flowing through the first hole passage 2411, so that the forces on the valve core 24' are balanced or almost balanced, which is beneficial to the stable operation of the valve core 24'. Other structures of the electric valve 100' are the same as the structures in the first embodiment, which will not be described in detail herein.

Figure 13:
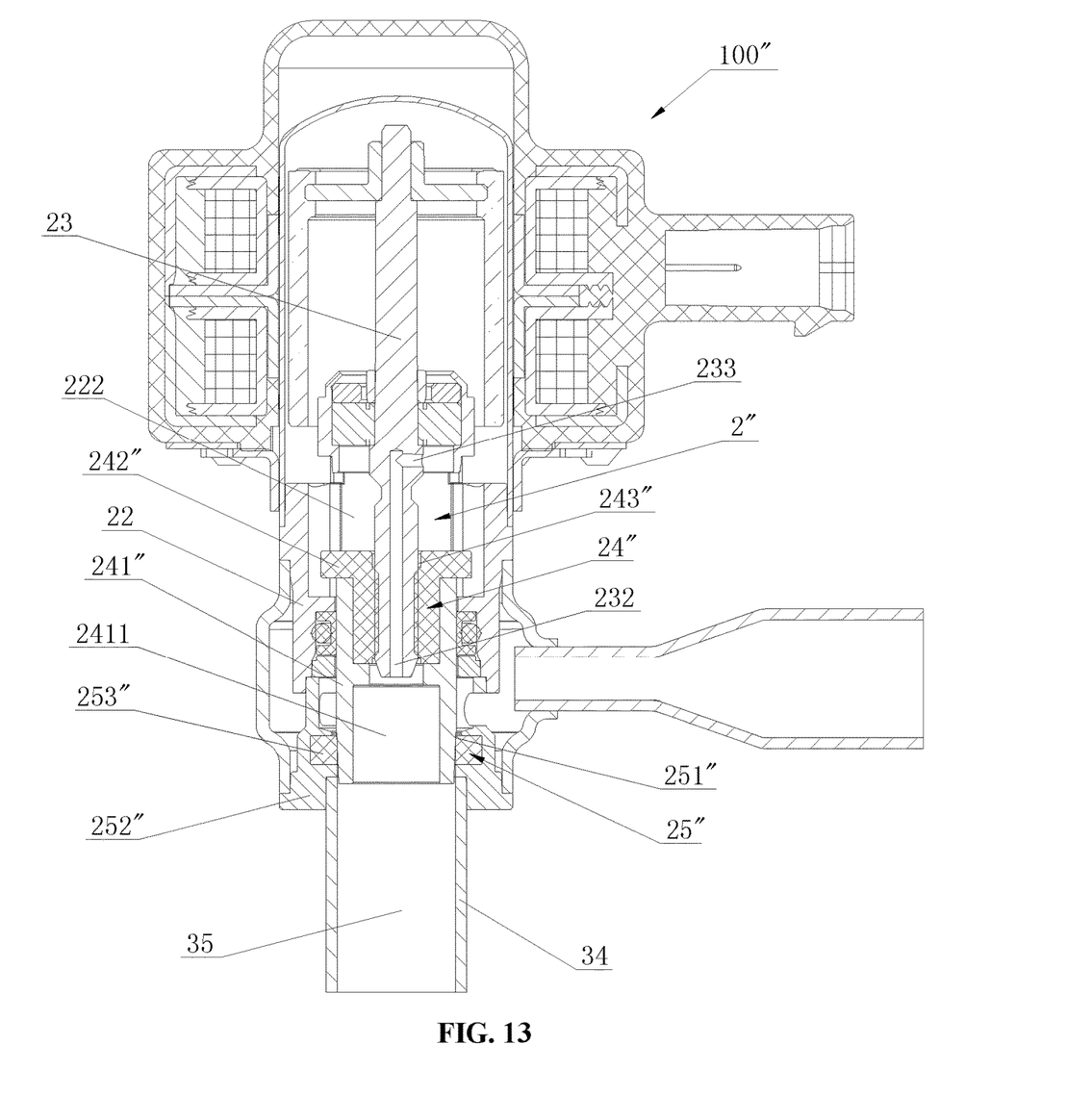
FIG. 13 is a schematic cross-sectional view of a third embodiment of the electric valve.

Referring to FIG. 13, FIG. 13 is a third embodiment of the electric valve. In the third embodiment, the valve component 2" includes a valve core assembly 24" and a valve core seat assembly 25". The valve core assembly 24" includes a valve core 241" and a nut member 242". The nut member 242" is integrally formed by injection molding with the valve core 241" being used as an injection molding insert. The nut member 242" is integrally formed by injection molding of a plastic material, and the valve core 241" is fixed to the nut member 242" by injection molding. The nut member 242" is provided with a threaded hole 243". The valve core 241" is provided with the first hole passage 2411. For the valve core assembly 24", the threaded hole 243" is in communication with the first hole passage 2411. A peripheral side wall forming the threaded hole 243" is provided with the internal thread section, and one end of the lead screw 23 is provided with the external thread section. The end of the lead screw 23 provided with the external thread section extends into the threaded hole 243" and is in a thread fit with the internal thread section of the nut member 242", thus achieving the threaded connection between the lead screw 23 and the valve core assembly 24". The valve core seat assembly 25" includes a valve core seat 252" and a first sealing ring 253". The valve core seat 252" is integrally formed. The first sealing ring 253" is integrally formed by injection molding with the valve core seat 252" being used as an injection molding insert. In this embodiment, the first sealing ring 253" is formed by injection molding of polyether ether ketone (PEEK). Alternatively, the first sealing ring 253" may be made of other plastic material with both required hardness and elasticity. The valve core seat assembly 25" is located at an outer periphery of the valve core 241", and the valve core seat assembly 25" is fixedly connected with the connecting seat 22. Specifically, the valve core seat assembly 25" is fixedly connected with the connecting seat 22 through the valve core seat 252", and the valve core seat 252" is fixedly connected with the connecting seat 22 by welding, interference fit or gluing. The first sealing ring 253" includes a valve port portion which forms a valve port 251". When the valve core 241" linearly reciprocates along the axial direction of the valve component 2", the valve core 241" can approach or move away from the valve port 251", so that the valve port 251" can be throttled, opened, or closed. In this embodiment, the balance passage is defined in the lead screw 23. The balance passage includes a first passage section 232 and a second passage section 233. The first passage section 232 is arranged along an axial direction of the lead screw 23, the second passage section 233 is arranged along a radial direction of the lead screw 23, and the first passage section 232 is in communication with the second passage section 233. The number of the second passage section 233 is at least one. The first hole passage 2411 is in communication with the first accommodating cavity 222 of the connecting seat 22 through the balance passage. Specifically, the first hole passage 2411 is in communication with the second passage section 232 through the first passage section 232, and the second passage section 232 is in communication with the first accommodating cavity 222. The second connecting pipe 34 is fixed to the valve core seat 252" by welding. The second connecting pipe 34 forms the second flow passage 35, and the second flow passage 35 is in communication with the first hole passage 2411. In this way, when the high-pressure fluid flows in from the second flow passage 35, part of the high-pressure fluid flows into the first accommodating cavity 222 through the first passage section 232 and the second passage section 233 after flowing through the first hole passage 2411, so that the forces on the valve core assembly 24" are balanced or almost balanced, which is beneficial to the stable operation of the valve core assembly 24". It should be noted that, combining the first embodiment and the third embodiment, it can be inferred that in the first embodiment, the nut member may be formed by injection molding with the valve core being used as an injection mold insert, and the balance passage is defined in the lead screw; or in the first embodiment, the valve core seat and the fixed seat are integrally formed, and the first sealing ring having the valve port is formed by injection molding with the integrally formed valve core seat being used as an injection mold insert, which simplifies the structure and assembly. Other structures of the electric valve 100" are the same as the structures in the first embodiment, which will not be described in detail herein.

It should be noted that, the above embodiments are only intended to illustrate rather than to limit the technical solutions described in the present application. For example, the definition of directionality such as "front", "back", "left", "right", "up" and "down" are merely for illustration. Although the present specification has been described in detail with reference to the embodiments described above, it should be understood by those skilled in the art that, modifications or equivalent substitutions can still be made by those skilled in the art to the technical solutions of the present application without departing from the spirit and scope of the present application, all of which should be covered within the scope of the claims of the present application.

The invention claimed is:

1. An electric valve, comprising a valve component, wherein the valve component comprises a lead screw and a valve core assembly, the lead screw is threadedly connected with the valve core assembly, the valve component is provided with a valve port, and the lead screw is configured to drive the valve core assembly to approach or move away from the valve port to adjust an opening degree of the valve port, wherein the valve core assembly comprises an internal thread section, the lead screw is provided with an external thread section, the valve core assembly is threadedly connected with the lead screw by means of the fitting of the internal thread section and the external thread section, and a material of at least a portion, corresponding to the internal thread section, of the valve core assembly comprises a plastic material;

the valve core assembly comprises a nut member and a valve core, the valve core covers a part of the nut member, the valve core is fixedly connected with the nut member, and a material of the nut member comprises a plastic material;

the nut member is provided with a threaded hole, a peripheral side wall forming the threaded hole is provided with the internal thread section, an end of the lead screw is provided with the external thread section, the end of the lead screw provided with the external thread section extends into the threaded hole, and the external thread section is in a thread fit with the internal thread section; and the nut member is integrally formed by injection molding with the valve core being used as an injection mold insert, and the nut member is fixed to the valve core by injection molding.

2. The electric valve according to claim 1, wherein the valve component comprises a valve core seat assembly, the valve core seat assembly comprises a valve port portion, the valve port portion forms the valve port, the valve core assembly is configured to abut against the valve port portion, a material of the valve port portion comprises a plastic material, or a material of at least a portion, correspondingly abutting against the valve port portion, of the valve core assembly comprises a plastic material.

3. The electric valve according to claim 2, wherein the valve core seat assembly comprises a valve core seat, a fixed seat and a first sealing assembly, wherein the valve core seat is assembled with the fixed seat to form an accommodating groove, a part of the first sealing assembly is located in the accommodating groove, the accommodating groove is sealed by the first sealing assembly, the first sealing assembly comprises a first sealing ring which is made of a plastic material, and the first sealing ring forms the valve port portion.

4. The electric valve according to claim 3, wherein the valve core seat comprises through hole portions; wherein along a radial direction of the valve core seat, the through hole portions extend through an outer peripheral wall of the valve core seat, the number of the through hole portions is at least two, the at least two through hole portions are uniformly distributed on the outer peripheral wall of the valve core seat, the at least two through hole portions are elongated holes, and hole cavities formed by the at least two through hole portions are in communication with the valve port.

5. The electric valve according to claim 2, wherein the valve core seat assembly comprises a valve core seat, a fixed seat and a first sealing ring, the valve core seat and the fixed seat are integrally formed, the first sealing ring is fixed to the valve core seat and the fixed seat by injection molding, the first sealing ring is made of a plastic material, and the first sealing ring forms the valve port portion.

6. The electric valve according to claim 5, wherein the valve core seat comprises through hole portions; wherein along a radial direction of the valve core seat, the through hole portions extend through an outer peripheral wall of the valve core seat, the number of the through hole portions is at least two, the at least two through hole portions are uniformly distributed on the outer peripheral wall of the valve core seat, the at least two through hole portions are elongated holes, and hole cavities formed by the at least two through hole portions are in communication with the valve port.

7. The electric valve according to claim 1, wherein the valve component comprises a connecting seat and a second sealing assembly, the connecting seat is provided with a first accommodating cavity and a second accommodating cavity, a part of the valve core assembly is located in the first accommodating cavity, another part of the valve core assembly is located in the second accommodating cavity, the second sealing assembly covers a part of the valve core assembly, the second sealing assembly is located in the second accommodating cavity, and the first accommodating cavity and the second accommodating cavity are sealingly separated by the second sealing assembly;

the valve component is provided with a balance passage, the valve core assembly is provided with a first hole passage, and the first hole passage is in communication with the first accommodating cavity through the balance passage.

8. The electric valve according to claim 7, wherein the nut member comprises a groove portion; wherein along a radial direction of the nut member, the groove portion is recessed inward from an outer side wall of the nut member, the groove portion is assembled with the valve core to form a balance groove cavity, the balance groove cavity forms at least part of the balance passage, and the first hole passage is in communication with the first accommodating cavity through the balance groove cavity.

9. The electric valve according to claim 1, wherein the valve component comprises a connecting seat, wherein the connecting seat is provided with a first accommodating cavity, the valve core assembly comprises a limiting portion, the limiting portion is a non-rotating body, the limiting portion is located in the first accommodating cavity, the connecting seat comprises a fitting portion, and the limiting portion cooperates with the fitting portion to limit circumferential rotation of the valve core assembly;

the valve component comprises a supporting assembly, wherein the supporting assembly is fixedly connected with the connecting seat, the supporting assembly covers a part of the lead screw, and the supporting assembly is configured to limit axial movement of the lead screw.

10. The electric valve according to claim 9, wherein the limiting portion comprises a limiting portion side surface, the fitting portion comprises a fitting portion side surface, the limiting portion side surface abuts against the fitting portion side surface, and an axial height of the fitting portion is larger than an axial height of the limiting portion;

the supporting assembly comprises a supporting frame, a bearing and a sleeve, wherein the supporting frame is fixedly connected with the connecting seat, the bearing covers a part of the lead screw, the bearing is fixedly connected with the supporting frame, the sleeve covers a part of the lead screw, the sleeve is fixedly connected with the lead screw, the lead screw comprises a shoulder, the shoulder protrudes outward along a radial direction of the lead screw; along an axial direction of the lead screw, the bearing is located between the shoulder and the sleeve, and the shoulder and the sleeve abut against the bearing.

11. The electric valve according to claim 1, wherein the valve core comprises a first crimping portion and a first mounting portion; along an axial direction of the valve core, the first crimping portion is higher than the first mounting portion, a first stepped portion is formed between the first crimping portion and the first mounting portion, the first mounting portion forms a first mounting cavity, a part of the nut member is located in the first mounting cavity, and the nut member is secured tightly between the first crimping portion and the first stepped portion by the first crimping portion.

* * * * *